Figure 1:
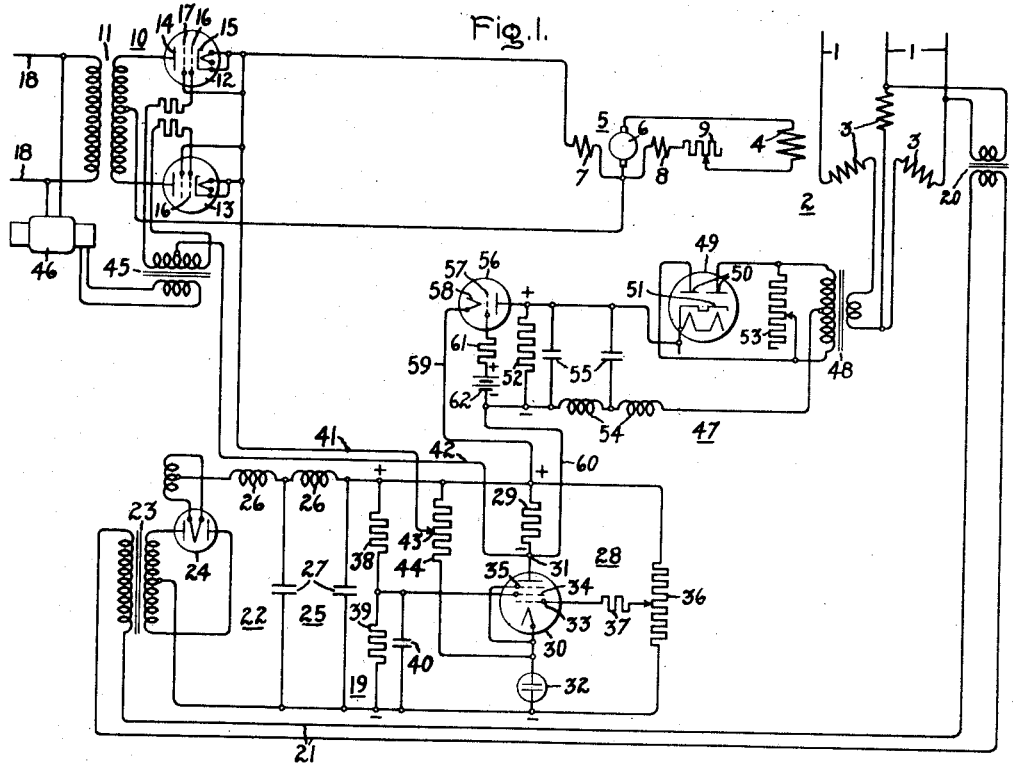

March 26, 1940.　　　　E. E. MOYER　　　　2,195,120
ELECTRIC CONTROL SYSTEM
Filed Sept. 30, 1938　　　2 Sheets-Sheet 1

Inventor:
Elmo E. Moyer,
by Harry E. Dunham
His Attorney.

Inventor:
Elmo E. Moyer,
by Harry E. Dunkin
Their Attorney.

Patented Mar. 26, 1940

2,195,120

UNITED STATES PATENT OFFICE 2,195,120

ELECTRIC CONTROL SYSTEM

Elmo E. Moyer, Scotia, N. Y., assignor to General Electric Company, a corporation of New York Application September 30, 1938, Serial No. 232,600

9 Claims. (Cl. 171—119)

My invention relates to electric control systems and more particularly to improved electric valve regulating systems of the type disclosed and claimed in a copending application of E. E. Moyer and O. W. Livingston, Serial No. 232,598, filed concurrently herewith and assigned to the assignee of the present application.

It has been found desirable in electric control systems to employ electric valve apparatus because of the precision of control and the rapidity of response inherently available in electric valve equipment. Furthermore, electric valve apparatus has been found desirable in the control of dynamo-electric machines, such as alternating current generators and synchronous condensers, because of the flexibility and great field of application in systems of this nature. In accordance with the teachings of my invention described hereinafter, I provide new and improved electric valve circuits of the nature of that disclosed and claimed in the above identified application and with particular reference to systems for controlling an operating condition, such as voltage, of alternating current synchronous generators or synchronous condensers.

It is an object of my invention to provide new and improved electric valve circuits.

It is another object of my invention to provide new and improved electric valve control circuits.

It is another object of my invention to provide new and improved electric valve control circuits for regulating electric translating apparatus.

It is a further object of my invention to provide new and improved electric valve regulating systems for dynamo-electric machines.

It is a still further object of my invention to provide new and improved electric valve regulating systems for synchronous condensers.

In accordance with the illustrated embodiments of my invention, I provide new and improved electric valve control systems for controlling an electrical condition of alternating current circuits, or for controlling an operating condition or an electrical condition of electric translating apparatus. More specifically, I provide improved electric valve circuits which control the voltage of alternating current circuits and which control the translating apparatus so that the current of the alternating current circuits remains substantially constant when the current tends to exceed a predetermined value and when the power factor of the system is of a predetermined character. The invention is shown as applied to a synchronous condenser in which the armature voltage is maintained substantially constant within predetermined ranges of armature current and within predetermined power factor limits. However, if the armature current tends to exceed a predetermined value in the leading region of operation, that is if the synchronous condenser attempts to supply a greater amount of leading reactive volt-amperes than that contemplated, the system automatically responds to control the field excitation of the condenser to maintain a substantially constant armature current, thereby preventing excessive overload and incident excessive heating of the condenser. A voltage sensitive or responsive circuit, including a rectifier, produces a unidirectional voltage which varies in accordance with the armature voltage of the condenser, and a serially-connected impedance element and an electronic discharge device provide a control voltage which is impressed on the control members of electric valve means which control the energization of the field winding of the condenser. I provide an improved current responsive circuit which differentiates or distinguishes between leading and lagging current transmitted by the armature winding of the condenser. The current responsive circuit takes over the control from the voltage responsive circuit when the armature current tends to exceed a predetermined value in the leading region of operation and maintains the armature current substantially constant.

In accordance with one of the illustrated embodiments of my invention, the current responsive circuit comprises an uncontrolled electronic discharge device which produces a variable unidirectional voltage across an impedance element, and a controlled electric valve means is connected between the current responsive circuit and the impedance element in the voltage responsive circuit to take over control when the current tends to exceed a predetermined value.

In accordance with another embodiment of my invention diagrammatically illustrated, the current responsive circuit comprises a controlled rectifier, the anode-cathode circuit of which is energized in accordance with the armature current of the synchronous condenser, and the grid circuits of which are energized in response to the voltage appearing across the impedance element in the voltage responsive circuit. Until the voltage appearing across the impedance element in the voltage responsive circuit decreases to a predetermined negative value, the controlled rectifier is maintained nonconductive and the current responsive circuit is ineffective. However, when the voltage across the impedance element tends to decrease, the controlled rectifier becomes conductive and takes over control from the voltage responsive circuit.

In accordance with a further embodiment of my invention, I provide a new and improved time delay circuit for use in systems of this nature in which there is permitted short-time or instantaneous overloads of the condenser within the leading region of operation. This circuit includes means for variably energizing the cathode heating elements of the electric valve means in the current responsive circuit in order to effect the time delay.

Figure 2:
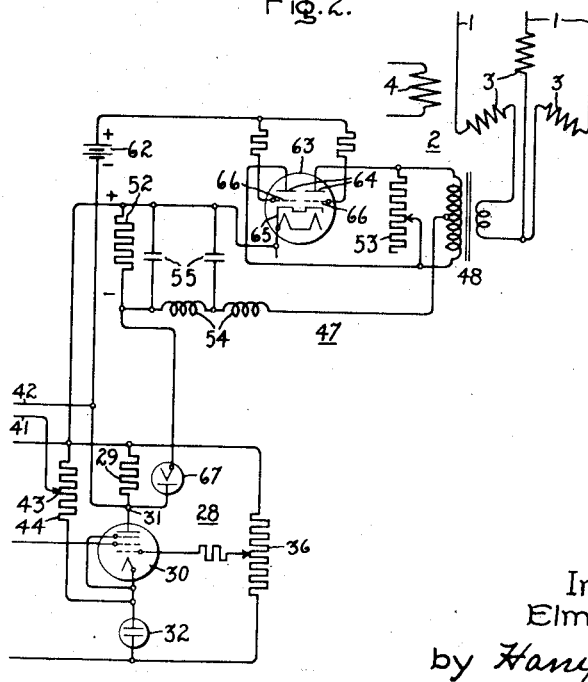
Figure 3:
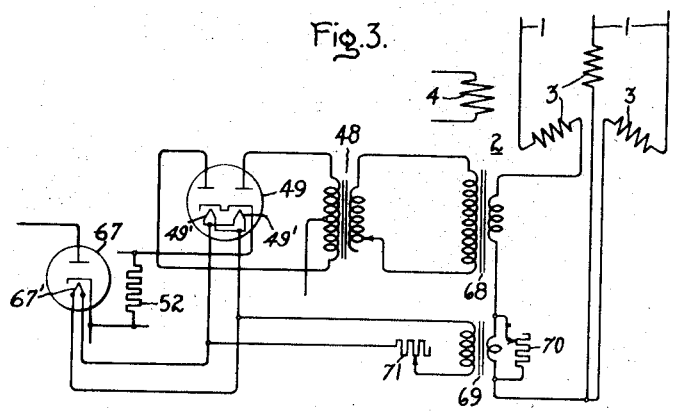

For a better understanding of my invention, reference may be had to the following description taken in connection with the accompanying drawings, and its scope will be pointed out in the appended claims. Fig. 1 diagrammatically illustrates an embodiment of my invention as applied to a regulating system for a synchronous condenser, and Fig. 2 represents a modification of the arrangement shown in Fig. 1. Fig. 3 diagrammatically illustrates an improved time delay circuit as applied to systems of this nature.

Referring now to Fig. 1 of the accompanying drawings, my invention is shown as applied to an electric valve system for controlling an electrical condition, such as the voltage, of an alternating current circuit 1. The voltage of the alternating current circuit 1 may be controlled by means of a synchronous condenser 2 comprising armature windings 3 and an excitation or field winding 4. The voltage of circuit 1, of course, may be controlled by variably energizing the field winding 4. If desired, I may employ an exciter 5 having an armature winding 6, a shunt field winding 7, and a series field winding 8 which transmits variable amounts of unidirectional current to the field winding 4 through a suitable controlling device such as an adjustable resistance 9. The armature voltage of the exciter 5 is controlled by means of a rectifier circuit 10 which comprises a transformer 11, a pair of electric valve means 12 and 13 which are preferably of the type employing an ionizable medium, such as a gas or a vapor, and each of which comprises an anode 14, a cathode 15, a control grid 16, and a shield grid 17 which may be connected to the cathode 15. Transformer 11 may be energized from any suitable source of alternating current 18. If desired, the circuit 18 may be connected to the circuit 1.

A voltage control or responsive circuit 19 is employed to control the resultant voltage impressed on control grids 16 of electric valves 12 and 13, and hence control the excitation and voltage of the synchronous condenser 2. The voltage controlling circuit 19 is energized in accordance with the armature voltage of condenser 2, or in accordance with the voltage of circuit 1, through a transformer 20 and a circuit 21. To produce a control voltage which varies in accordance with the voltage of circuit 1 or the armature voltage of condenser 2, I employ a suitable rectifying circuit 22 which may be of the biphase type comprising a transformer 23 and a suitable unidirectional conducting device such as an electric valve 24. The output circuit of the rectifier 22 is connected to a suitable filter circuit 25 comprising inductances 26 and capacitances 27. As a means for amplifying the variations in magnitude of the variable unidirectional voltage produced by rectifier 22, I employ a suitable amplifier circuit 28, such as that disclosed and claimed in my copending application Serial No. 232,599 filed concurrently herewith and assigned to the assignee of the present application. The amplifier circuit 28 comprises a serially-connected impedance element, such as a resistance 29 and an electronic discharge device 30 which is connected to the resistance 29, having a common juncture 31. A suitable constant voltage device or element, such as a glow discharge valve 32, is connected in series relation with the resistance 29 and the glow discharge device 30 across the output circuit of the filter circuit 25. The electronic discharge device 30 is preferably of the high vacuum type having a control grid 33, a screen grid 34 which is employed as a second control grid, and a suppressor grid 35. There is impressed on the control grid 33 the entire increment or decrement of the variable unidirectional voltage supplied by the rectifier 22 through a suitable voltage divider comprising a resistance 36. A current limiting resistance 37 may be connected in series relation with the control grid 33, if desired. In like manner, the screen grid 34 may be energized from a voltage divider which is connected to the output circuit of the rectifier 22 and may comprise serially-connected resistances 38 and 39. A capacitance 40 may be connected between the lower terminal of the glow discharge valve 32 and the screen grid 34 to absorb extraneous transient voltages which may be present in the system. An output circuit for circuit 28 comprises conductors 41 and 42 which are connected to an adjustable point 43 of a resistance 44 and to the juncture 31, respectively. The resistance 44 is connected between the positive terminal of the output circuit of rectifier 22 and the common juncture of the electronic discharge device 30 and the glow discharge valve 32.

The cathodes 15 of electric valves 12 and 13 are connected to the adjustable point or tap 43 of resistance 44 through the conductor 41, and the conductor 42 is connected to a secondary winding of a transformer 45 which supplies alternating voltages of predetermined phase displacement with respect to the anode-cathode voltage of electric valves 12 and 13. The transformer 45 may be energized from any suitable source of alternating current correlated in phase and frequency with respect to the anode-cathode voltage, and in the arrangement illustrated is shown as being energized from the alternating current circuit 18 through a suitable phase shifting device such as a rotary phase shifter 46.

I provide a circuit 47 which is responsive to a second electrical condition of the alternating current circuit 1 or a second electrical condition of the synchronous condenser 2. The circuit 47 may be connected to be directly responsive to the current of circuit 1 or the armature current of condenser 2, and may be arranged to be responsive to the power factor of circuit 1 or to the power factor of the armature current of synchronous condenser 2. Circuit 47 comprises a transformer 48 which is energized in accordance with the armature current of condenser 2, and also may comprise an electric valve 49 of the uncontrolled type comprising a pair of electronic discharge paths contained within a single envelope, such as that provided by a pair of anodes 50 and an electrically common cathode 51. The electric valve means 49 may be of the high vacuum type or of the gaseous type employing an ionizable medium, such as a gas or a vapor, and operates to transmit variable amounts of unidirectional current to a second impedance element such as a resistance 52 connected in the output circuit thereof. A suitable adjustable resistance 53 may be connected across the secondary winding of transformer 48 to control the voltage and hence to effect an adjustment of the value of current at which the circuit becomes operative. I employ a time delay circuit comprising inductances 54 and capacitances 55 which permit transient or short-time overloads but which prohibit or prevent sustained overloads.

I provide a controlled electric valve means 56, which is preferably of the high vacuum type, to bring the current responsive circuit 47 into operation when the armature current of condenser 2 tends to exceed a predetermined value and when the condenser 2 is operating in the leading region. The electric valve means 56 comprises a control grid 57 which controls the conductivity thereof, and the control grid circuit is energized in accordance with the voltage appearing across the terminals of the resistance 29 of circuit 28. A cathode 58 of the electric valve 56 is connected to the positive terminal of the output circuit of rectifier 22 through a conductor 59, and the control grid 57 is connected to the common juncture 31 through a conductor 60, a current limiting resistance 61 and a source of unidirectional biasing potential such as a battery 62. The battery 62 is poled so that it tends to render the electric valve means 56 conductive and, of course, opposes the unidirectional voltage obtained across the terminals of resistance 29.

The operation of the embodiment of my invention diagrammatically illustrated in Fig. 1 will be explained by considering the system when the condenser 2 is operating to maintain the voltage of the alternating current circuit 1 within a predetermined range of values. The field winding 4 is variably energized by the exciter 5, and field winding 7 of exciter 5 is variably energized by the rectifier circuit 10. The conductivities of the electric valves 12 and 13 are varied by means of the variable control voltage impressed on the grids 16 through conductors 41 and 42 to transmit variable amounts of current to winding 7.

Voltage sensitive or controlling circuit 19 operates to vary the voltage of the circuit including conductors 41 and 42 to maintain the voltage of circuit 1 substantially constant. Electronic discharge device 30 conducts variable amounts of unidirectional current through resistance 29 to vary the unidirectional voltage impressed on control grids 16. So long as the armature current of condenser 2 does not exceed a predetermined value, the circuit 19 maintains control. However, if the armature current of the condenser 2 tends to exceed a predetermined value in the leading region of operation, the current responsive circuit 47 takes over control from circuit 19 and limits the magnitude of the voltage appearing across resistance 29. Within the lagging region of operation, the circuit 47 is ineffective inasmuch as the negative unidirectional voltage appearing across resistance 29 is sufficiently great to counteract the effect of the voltage of battery 62, thereby maintaining the electric valve 56 nonconductive. However, in the leading region of operation, if the voltage appearing across resistance 52 reaches a sufficiently large value in accordance with the current transmitted by armature windings 3, electric valve 56 is rendered conductive by virtue of the reduction in the negative voltage appearing across resistance 29. When electric valve 56 is rendered conductive, circuit 47 takes over control and maintains a substantially constant armature current, thereby preventing overload of the synchronous condenser 2. When the electric valve 56 is conductive, it will be observed that the voltage across the terminals of resistance 29 is controlled by the current responsive circuit 47, thereby rendering the voltage responsive circuit 19 ineffective. If the armature current decreases below the predetermined value, the voltage controlling circuit 19 then acquires control since the electric valve 56 is rendered nonconductive when the negative unidirectional biasing potential of resistance 29 increases sufficiently.

An important feature of my invention is the selective operation of the system, by virtue of which an excessive overload of the synchronous condenser 2 is prevented by limiting the field excitation of the synchronous condenser when it is operating in the leading region. The system permits the synchronous condenser to transmit a larger amount of lagging reactive volt-amperes than leading reactive volt-amperes. Of course, this is not objectionable generally and in many applications is highly desirable since the condensers are constructed or designed to transmit larger amounts of lagging reactive volt-amperes than leading reactive volt-amperes.

Fig. 2 diagrammatically illustrates another embodiment of my invention which is similar in many respects to that shown in Fig. 1, and corresponding elements have been assigned like reference numerals. In the arrangement of Fig. 2, I employ a controlled electric valve rectifier 63 having a pair of anodes 64, an electrically common cathode 65 and control grids 66. It is to be understood that I may employ separate electric valves, if desired. The electric valve rectifier 63 is preferably of the type employing an ionizable medium. The anode-cathode circuits of the rectifier 63 are energized in accordance with the armature current of condenser 2 and the grid circuits are energized in accordance with the voltage appearing across terminals of resistance 29 in circuit 28. Battery 62 is connected to impress a positive biasing voltage on the control grids 66. A suitable unidirectional conducting device, such as an electric valve 67, may be connected between the negative terminal of resistance 52 and the common juncture 31 to transmit current between resistance 29 and resistance 52 when the magnitude of the voltage across resistance 52 attains a predetermined value, and to thereby limit the energization of the field winding 4.

The general principles of operation of the arrangement of Fig. 2 are substantially the same as that explained above in connection with Fig. 1. Within predetermined ranges of armature current of condenser 2, the circuit 19 operates to maintain the armature voltage substantially constant. However, if the current tends to exceed a predetermined value in the leading region of operation, the negative voltage appearing across resistance 29 decreases sufficiently to permit the positive voltage furnished by battery 62 to render electric valve 63 conductive. Under such conditions, the electric valve 63 operates as a full wave rectifier to produce a voltage across the terminals of resistance 52 which varies in accordance with the armature current of condenser 2. Upon the concurrence of these two conditions, that is when the power factor is leading and when the armature current tends to exceed a predetermined value, the circuit 47 takes over control and maintains substantially constant current in the armature windings 3. This control is effected when the voltage drop across resistance 52 is sufficient to cause the electric valve 67 to conduct current. When the electric valve 67 is conductive, circuit 47 controls the voltage across resistance 29. The arrangement of Fig. 2 is selectively responsive to the power factor of circuit 1 or the power factor of the armature current of condenser 2 and permits the condenser 2 to transmit a larger amount of lagging reactive volt-amperes than leading reactive volt-amperes.

Fig. 3 diagrammatically shows another embodiment of my invention where it is desired to provide an arrangement for the purpose of obtaining greater time delay between the time the preset value of armature current is exceeded and the time when the current controlling circuit 47 can take over control. I provide means for variably energizing cathode heating elements 49' of the filamentary cathodes of electric valve 49 in accordance with the current of circuit 1 or in accordance with the armature current of condenser 2. Electric valve 49 in this arrangement is of the high vacuum type. Transformer 68 is connected to be responsive to the armature current and a transformer 69 is connected to energize variably the cathode heating elements 49' and 67' of electric valves 49 and 67 respectively. A variable resistance 70 may be connected across the primary winding of transformer 69 to select the secondary voltage which is applied to the cathode heating elements, and a resistance 70 may be connected across the primary winding 69 to control the secondary voltage of transformer 69. A resistance 71 may be connected in series relation with the secondary winding of transformer 69 to control the portion of the secondary voltage which is applied to the cathode heating elements.

Electric valve 49, which controls the voltage across the terminals of resistance 52 and hence controls the time at which the current responsive circuit 47 takes over control from the voltage controlling circuit 19, is arranged to afford an appreciable time delay to permit instantaneous or transient overloads in the leading region of operation. Since the cathode heating elements 49' of the electric valve 49 are energized in accordance with the armature current, the conductivity of this valve increases as the armature current increases, but the effect of such increased energization of the cathode heating elements is not evidenced instantaneously but is brought about only after a predetermined time delay which depends upon the thermal capacity of the cathode heating elements and the associated structure. An instantaneous or short-time overload is not sufficient to increase the conductivity of the electric valve 49 sufficiently to increase the voltage of resistance 52 to that value required to render the electric valve 67 conductive. However, a sustained overload permits the temperature of the cathodes 49' of electric valve 49 to increase substantially, effecting an appreciable increase in the current conducted by the valve and hence raises the voltage across resistance 52. In this manner the electric valve 49 affords an appreciable time delay without using a separate time delay circuit.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. In combination, an alternating current circuit, translating apparatus for controlling an electrical condition of said circuit and comprising electric valve means having a control member for controlling the conductivity thereof, a circuit responsive to said electrical condition for energizing said control member and comprising a rectifier for producing a unidirectional voltage wihch varies in magnitude in accordance with said electrical condition and a serially-connected impedance element and an electronic discharge device connected to be energized by said rectifier, a circuit responsive to another predetermined electrical condition of said alternating current circuit and comprising an electric valve means of the controlled type having a control grid, and means connected between said impedance element and said control grid for controlling the conductivity of said second mentioned electric valve means.

2. In combination, an alternating current circuit, translating apparatus for controlling the voltage of said circuit and comprising electric valve means having a control member for controlling the conductivity thereof, a voltage sensitive circuit comprising a rectifier for producing a unidirectional voltage which varies in magnitude in acordance with the voltage of said alternating current circuit and a serially-connected impedance element and an electronic discharge device connected to be energized by said rectifier, a circuit responsive to the current of said alternating current circuit and comprising an electric valve means of the controlled type having a control grid, and means connected between said impedance element and said control grid for controlling the voltage across said impedance element when the current of said alternating current attains a predetermined value.

3. In combination, an alternating current circuit, translating apparatus for controlling an electrical condition of said circuit and comprising electric valve means having a control member for controlling the conductivity thereof, a circuit responsive to said electrical condition and comprising a rectifier for producing a unidirectional voltage which varies in magnitude in accordance with said electrical condition, a serially-connected impedance element and an electronic discharge device connected to be energized by said rectifier and a resistance connected across said impedance element and said discharge device, a circuit responsive to another predetermined electrical condition of said alternating current circuit and comprising a rectifier for producing a voltage which varies in accordance with said second mentioned electrical condition, an electric valve means having a control grid connected between said second mentioned rectifier and said impedance element, and a circuit connected between said impedance element and said grid for rendering said last mentioned electric valve means conductive when the potential across said impedance element decreases to a predetermined value.

4. In combination, an alternating current circuit, translating apparatus for controlling an electrical condition of said circuit and comprising electric valve means having a control member for controlling the conductivity thereof, a circuit responsive to said electrical condition and comprising a rectifier for producing a unidirectional voltage which varies in magnitude in accordance with said electrical condition and a serially-connected impedance element and an electronic discharge device connected to be energized by said rectifier, a circuit responsive to another predetermined electrical condition of said alternating current circuit and comprising a rectifier for producing a voltage which varies in accordance with said second mentioned electrical condition, and a controlled electric valve means connected between said last mentioned circuit and said impedance element for taking over control when said second mentioned electrical condition attains a predetermined value.

5. In combination, an alternating current circuit, electric translating apparatus for controlling the voltage of said circuit and comprising an electric valve means having a control member for controlling the conductivity thereof, a voltage responsive circuit comprising a rectifier for producing a unidirectional voltage which varies in accordance with the voltage of said alternating current circuit, a serially-connected impedance element and an electronic discharge device connected to be energized by said rectifier and a resistance connected across said impedance element and said discharge device, an output circuit connected between a point of said resistance and the common juncture of said impedance element and said discharge device, a circuit responsive to the current of said alternating current circuit and comprising a rectifier, and a controlled electric valve means connected across said impedance element for controlling the voltage appearing thereacross when the current of said alternating current circuit attains a predetermined value.

6. In combination, an alternating current circuit, electric translating apparatus for controlling the voltage of said circuit and comprising an electric valve means having a control member for controlling the conductivity thereof, a voltage sensitive circuit comprising a rectifier for producing a unidirectional voltage which varies in magnitude in accordance with the voltage of said alternating current circuit, a serially-connected impedance element and an electronic discharge device connected to be energized by said rectifier and a resistance connected across said impedance element and said discharge device, an output circuit connected between a point of said resistance and the common juncture of said impedance element and said electronic discharge device for producing a control voltage which varies in polarity in accordance with the power factor of said alternating current circuit, a current responsive circuit comprising a rectifier for producing an output voltage which varies in accordance with the current of said alternating current circuit, a controlled electric valve means connected between said last mentioned rectifier and said impedance element, said controlled electric valve means being maintained nonconductive by the voltage appearing across said impedance element when the power factor of the current of said alternating current circuit is of one character and being arranged to be rendered conductive by the voltage appearing across said impedance element when the power factor of the current of said alternating current circuit is of the opposite character.

7. In combination, an alternating current circuit, translating apparatus for controlling the voltage of said circuit and comprising electric valve means having a control member for controlling the conductivity thereof, a voltage responsive circuit for energizing said control member and comprising a rectifier for producing a unidirectional voltage which varies in magnitude in accordance with the voltage of said alternating current circuit and a serially-connected impedance element and an electronic discharge device connected to be energized by said rectifier, a current responsive circuit comprising an electric valve means for producing a control voltage which varies as the current of said alternating current circuit, an electric valve means having a filamentary cathode connected between said impedance element and said current responsive circuit for effecting transfer of control from said voltage responsive circuit to said current responsive circuit when said control voltage attains a predetermined value, and means for variably energizing said cathode in accordance with the current of said alternating current circuit to provide a time delay in effecting the transfer of control from said voltage responsive circuit to said current responsive circuit.

8. In combination, an alternating current circuit, translating apparatus for controlling the voltage of said circuit and comprising electric valve means having a control member for controlling the conductivity thereof, a voltage responsive circuit for energizing said control member and comprising a rectifier for producing a unidirectional voltage which varies in magnitude in accordance with the voltage of said alternating current circuit and a serially-connected impedance element and an electronic discharge device connected to be energized by said rectifier, a current responsive circuit comprising a resistance and a rectifier for producing across said resistance a control voltage which varies in accordance with the current of said alternating current circuit, means for effecting transfer of control from said voltage responsive circuit to said current responsive circuit comprising an electric valve means having a filamentary cathode, and means for variably energizing said cathode in accordance with the current of said alternating current circuit to provide a time delay in effecting transfer of control from said voltage responsive circuit to said current responsive circuit.

9. In combination, an alternating current circuit, translating apparatus for controlling the voltage of said circuit and comprising electric valve means having a control member for controlling the conductivity thereof, a voltage responsive circuit for energizing said control member and comprising a rectifier for producing a unidirectional voltage which varies in magnitude in accordance with the voltage of said alternating current circuit and a serially-connected impedance element and an electronic discharge device connected to be energized by said rectifier, a current responsive circuit comprising a resistance and an electric valve means having a filamentary cathode for producing across the terminals of said resistance a control voltage which varies in accordance with the current of said alternating current circuit, a transfer electric valve means having a filamentary cathode and being connected between said impedance element and said resistance for effecting transfer of control from said voltage responsive circuit to said current responsive circuit when said control voltage attains a predetermined value, and means for effecting a time delay in the transfer of control from said voltage responsive circuit to said current responsive circuit comprising means for energizing said filamentary cathodes variably in accordance with the current transmitted by said alternating current circuit.

ELMO E. MOYER.